US009000401B2

(12) United States Patent
Rink et al.

(10) Patent No.: US 9,000,401 B2
(45) Date of Patent: Apr. 7, 2015

(54) FIBER OPTIC RADIOCHROMIC DOSIMETER PROBE AND METHOD TO MAKE THE SAME

(75) Inventors: Alexandra Rink, Toronto (CA); David Jaffray, Etobicoke (CA); Ozzy Mermut, Charlesbourg (CA); Serge Caron, Saint-Augustin-De-Desmaures (CA); André Croteau, Saint-Agapit (CA); François Roy-Moisan, Montréal (CA)

(73) Assignees: Institut National D'Optique, Québec (Quebec) (CA); University Health Network, Toronto (Ontario) (CA)

(*) Notice: Subject to any disclaimer, the term of this patent is extended or adjusted under 35 U.S.C. 154(b) by 164 days.

(21) Appl. No.: 13/806,342

(22) PCT Filed: Jul. 6, 2011

(86) PCT No.: PCT/IB2011/053006
§ 371 (c)(1),
(2), (4) Date: Dec. 21, 2012

(87) PCT Pub. No.: WO2012/004757
PCT Pub. Date: Jan. 12, 2012

(65) Prior Publication Data
US 2013/0105692 A1 May 2, 2013

Related U.S. Application Data

(60) Provisional application No. 61/362,082, filed on Jul. 7, 2010.

(51) Int. Cl.
*G01T 1/06* (2006.01)
*G01T 1/20* (2006.01)

(52) U.S. Cl.
CPC ............. *G01T 1/06* (2013.01); *Y10T 29/49826* (2015.01); *G01T 1/201* (2013.01)

(58) Field of Classification Search
CPC .......................................................... G01T 1/06
USPC ...................................................... 250/474.1
See application file for complete search history.

(56) References Cited

U.S. PATENT DOCUMENTS 4,227,084 A 10/1980 Thomann et al.
4,254,200 A 3/1981 Thomann et al.
(Continued)

FOREIGN PATENT DOCUMENTS

CA 2611834 5/2009
DE 3929294 3/1991
(Continued)

OTHER PUBLICATIONS

Niroomand-Rad et al., "Radiochromic Film Dosimetry: Recommendations of AAPM Radiation Therapy Committee Task Group No. 55", AAPM Report No. 63, Dec. 1998, 25 pages, American Association of Physicists in Medecine, College Park, MD.
(Continued)

*Primary Examiner* — Constantine Hannaher
(74) *Attorney, Agent, or Firm* — Fasken Martineau

(57) ABSTRACT

A fiber optic dosimeter probe for sensing radiation dose including an optical fiber having a free end and a sensitive end, a window having a sensitive side and a rear side; a radiation sensitive layer between the sensitive end of the optical fiber and a sensitive side of the window, the radiation sensitive layer being made of a material having an optical property that changes with absorbed radiation dose, an amount of the material corresponding to a predetermined sensitivity to radiation; wherein the window and the optical fiber have a near water equivalent interaction with radiation and are MR compatible.

27 Claims, 10 Drawing Sheets

(56) References Cited

U.S. PATENT DOCUMENTS

| | | | |
|---|---|---|---|
| 4,489,240 | A | 12/1984 | Kronenberg et al. |
| 4,734,355 | A | 3/1988 | Lewis et al. |
| 4,784,934 | A | 11/1988 | Lewis et al. |
| 5,002,852 | A | 3/1991 | Lewis et al. |
| 5,030,834 | A | 7/1991 | Lindmayer et al. |
| 5,332,903 | A | 7/1994 | Buehler et al. |
| 5,777,341 | A | 7/1998 | Seiwatz et al. |
| 5,892,234 | A | 4/1999 | McKeever et al. |
| 5,938,605 | A | 8/1999 | Hasing et al. |
| 5,962,857 | A | 10/1999 | McKeever et al. |
| 6,041,150 | A | 3/2000 | Hasing et al. |
| 6,278,117 | B1 | 8/2001 | Bardash |
| 6,514,277 | B1 | 2/2003 | Lilge et al. |
| 6,936,830 | B2 | 8/2005 | Gaza et al. |
| 7,011,814 | B2 | 3/2006 | Suddarth et al. |
| 7,227,158 | B1 | 6/2007 | Patel et al. |
| 7,361,134 | B2 | 4/2008 | Rozenfeld et al. |
| 7,399,977 | B2 | 7/2008 | Rink et al. |
| 7,407,640 | B2 | 8/2008 | Barrera et al. |
| 7,420,187 | B1 | 9/2008 | Klemic et al. |
| 7,439,524 | B2 | 10/2008 | Katzir et al. |
| 7,441,955 | B2 | 10/2008 | Guyonnet et al. |
| 7,476,874 | B2 | 1/2009 | Patel |
| 7,485,877 | B2 | 2/2009 | Kearfott |
| 7,491,942 | B2 | 2/2009 | Black et al. |
| 7,495,224 | B2 | 2/2009 | Widener et al. |
| 7,510,699 | B2 | 3/2009 | Black et al. |
| 7,534,560 | B2 | 5/2009 | Lu et al. |
| 7,554,090 | B2 | 6/2009 | Coleman et al. |
| 7,557,353 | B2 | 7/2009 | Black et al. |
| 7,652,268 | B2 | 1/2010 | Patel |
| 7,663,123 | B2 | 2/2010 | Fleming et al. |
| 2006/0017009 | A1* | 1/2006 | Rink et al. ............. 250/484.5 |
| 2008/0023647 | A1 | 1/2008 | Patel |
| 2008/0161632 | A1 | 7/2008 | Rozenfeld et al. |
| 2008/0164416 | A1 | 7/2008 | Safai |
| 2008/0217551 | A1 | 9/2008 | Zhang et al. |
| 2009/0001286 | A1 | 1/2009 | Kearfott |
| 2009/0010390 | A1 | 1/2009 | Saoudi et al. |
| 2009/0014665 | A1 | 1/2009 | Fleming et al. |
| 2009/0099276 | A1 | 4/2009 | Barrera et al. |
| 2009/0101825 | A1 | 4/2009 | Kearfott |
| 2009/0114823 | A1 | 5/2009 | Pychlau et al. |
| 2009/0121144 | A1 | 5/2009 | Black et al. |
| 2009/0127469 | A1 | 5/2009 | Widener et al. |
| 2009/0180962 | A1 | 7/2009 | Black et al. |
| 2009/0218495 | A1 | 9/2009 | Leroux et al. |
| 2009/0326358 | A1 | 12/2009 | Malak |

FOREIGN PATENT DOCUMENTS

| | | |
|---|---|---|
| EP | 0416493 | 3/1991 |
| EP | 1857836 | 11/2007 |
| EP | 1962108 | 8/2008 |
| EP | 2077457 | 7/2009 |
| WO | 9717595 | 5/1997 |
| WO | 0062092 | 10/2000 |
| WO | 0152622 | 7/2001 |
| WO | 03092813 | 11/2003 |
| WO | 2004017095 | 2/2004 |
| WO | 2008038662 | 9/2007 |
| WO | 2009062311 | 5/2009 |
| WO | 2010017218 | 2/2010 |
| WO | 2010014630 | 2/2013 |

OTHER PUBLICATIONS

3M Innovation, "Vikuiti™ Enhanced Specular Reflector (ESR)", Application Guidelines, 2003, 4 pages, Electronic Display Lighting Optical Systems Division, St. Paul, MN.

Rink, "Point-Based Ionizing Radiation Dosimetry Using Radiochromic Materials and a Fibre Optic Readout System", Thesis, 2008, 167 pages, University of Toronto, Toronto, Canada.

Rink et al., "Intra-irradiation changes in the signal of polymer-based dosimeter (GAFCHROMIC EBT) due to dose rate variations", Physics in Medecine and Biology, Oct. 26, 2007, N523-N529, vol. 52, IOP Publishing, United Kingdom.

Rink et al., "Suitability of radiochromic medium for real-time optical measurements of ionizing radiation dose", Medical Physics, Apr. 2005, pp. 1140-1155, vol. 32, No. 4, American Association of Physicits in Medecine, United States.

Rink et al., "Characterization and real-time optical measurements of the ionizing radiation dose response for a new radiochromic medium", Medical Physics, Aug. 2005, pp. 2510-2516, vol. 32, No. 8, American Association of Physicits in Medecine, United States.

Rink et al., "Energy dependence (75 kVp to 18 MV) of radiochromic films assessed using a real-time optical dosimeter", Medical Physics, Feb. 2007, pp. 458-463, vol. 34, No. 2, American Association of Physicits in Medecine, United States.

Rink et al., "Temperature and hydration effects on absorbance spectra and radiation sensitivity of a radiochromic medium", Medical Physics, Oct. 2008, pp. 4545-4555, vol. 35, No. 10, American Association of Physicits in Medecine, United States.

Caron et al., "Selecting the Appropriate Splitter for a Reflective Optical Fiber Dosimeter Probe", SPIE Digital Library, 2012, 9 pages, vol. 8412, art. No. 84120D, Proc. of SPIE, United States.

Croteau et al., "Fabrication and characterization of a real-time optical fiber dosimeter probe", SPIE Digital Library, 2011, 6 pages, vol. 8090, art. No. 80900G, Proc. of SPIE, United States.

Croteau et al., "Real-time optical fiber dosimeter probe", SPIE Digital Library, 2011, 7 pages, vol. 7894, art. No. 789406, Proc. of SPIE, United States.

* cited by examiner

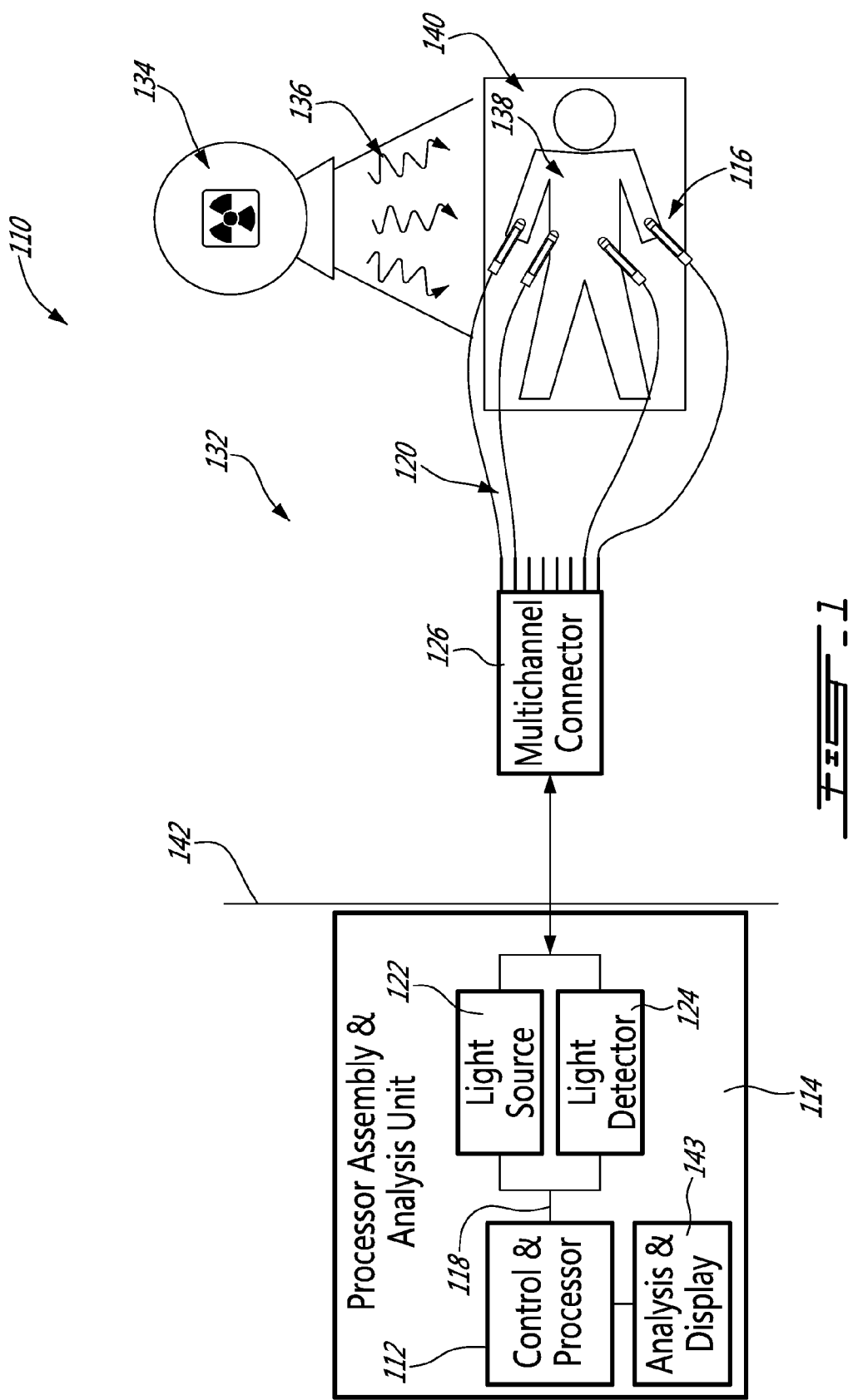

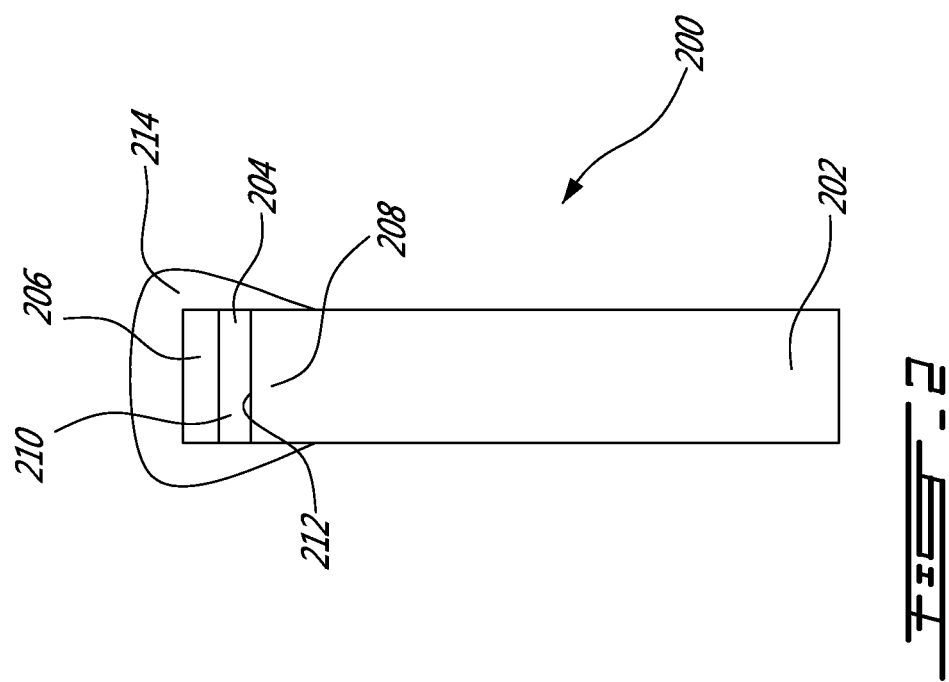

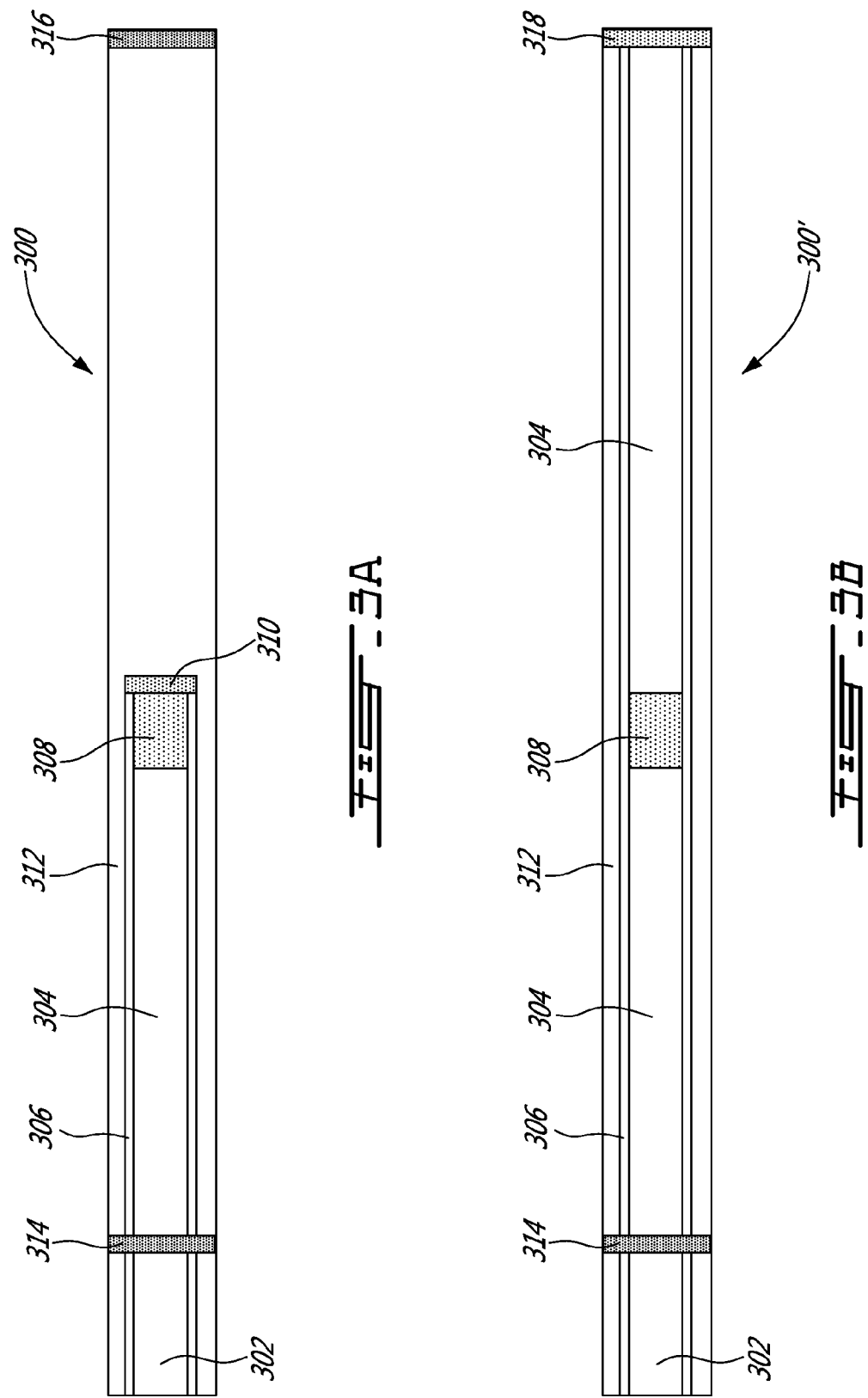

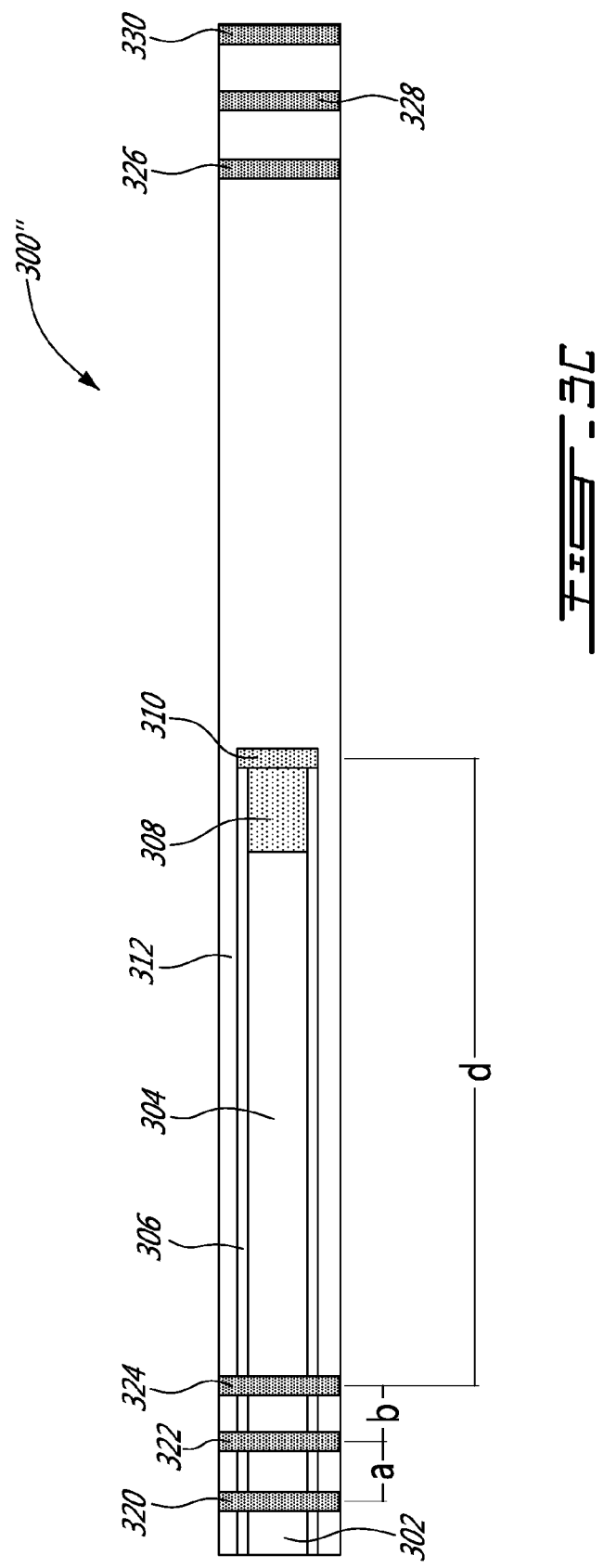

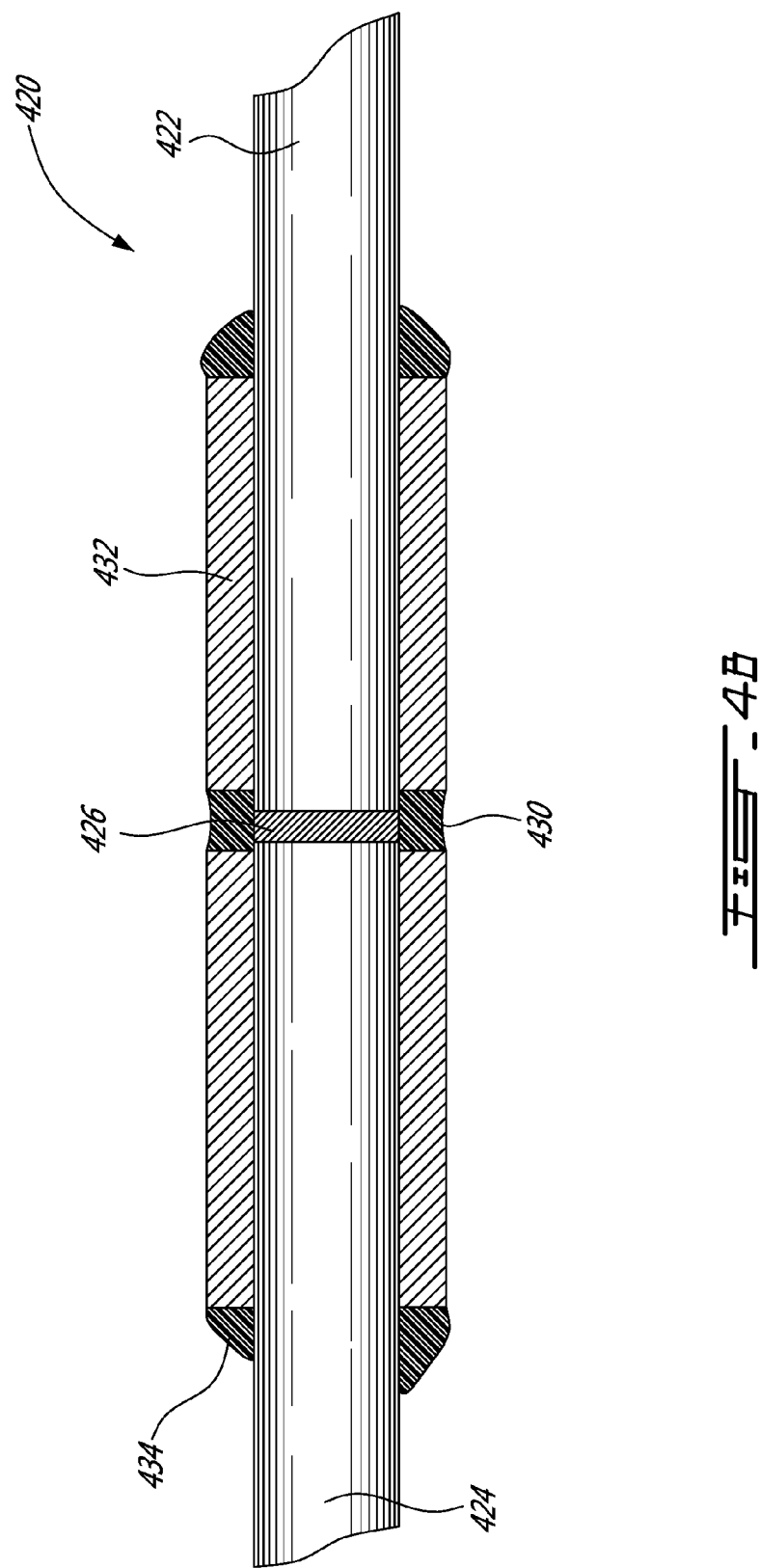

FIBER OPTIC RADIOCHROMIC DOSIMETER PROBE AND METHOD TO MAKE THE SAME

CROSS-REFERENCE TO RELATED APPLICATIONS

The present application is a national phase entry of PCT Application No. PCT/IB2011/053006, entitled "FIBER OPTIC RADIOCHROMIC DOSIMETER PROBE AND METHOD TO MAKE THE SAME" filed Jul. 6, 2011; which in turn claims priority of U.S. provisional patent application No. 61/362,082 filed Jul. 7, 2010, the specifications of which are hereby incorporated by reference.

TECHNICAL FIELD

The invention relates to dosimeters for radiotherapy and more specifically to a fiber optic radiochromic dosimeter probe.

BACKGROUND OF THE ART

Scientists at University Health Network have recently developed an in-vivo optical dosimeter platform used for the real-time monitoring of radiation dose delivered to clinical radiotherapy patients. Their dosimeter platform is described in U.S. Pat. No. 7,399,977. It enables radiotherapy techniques such as MR-guided Radiotherapy (MRgRT) and MR-guided brachytherapy and imminent quality assurance requirements for the field. The unique advantage of this platform is in its MR-compatible features, water-equivalent composition and real-time readout.

Radiotherapy is commonly used alone or in conjunction with other therapies to cure or control malignant disease. It works by delivering a predetermined dose of ionizing radiation to the desired volume, while limiting the dose deposited in the surrounding healthy organs. Thus the outcome of treatment is highly dependent on the accuracy of the prescribed dose and fractionation, as well as the spatial distribution. While the modern dose calculation and delivery techniques are becoming more complex, there is also a strong trend towards dose escalation, steeper dose gradients close to the tumor, and hypofractionation—aspects of treatment that can lead to serious complications if errors were made during delivery. These errors can occur due to internal and external motion artifacts (i.e. patient movement, breathing, etc), dose calculation and human mistakes.

Various types of dosimeters are already used in radiotherapy to perform quality assurance of the beam characteristics, and some are capable of monitoring dose delivery during treatment. Unfortunately the reasons individual treatment monitoring is not currently performed as part of standard treatment are instrumentation and implementation complexity and expense.

Furthermore, verification of delivered dose is appealing not only from a quality assurance point of view, but also from a point of investigative and clinical research. The list of applications may be, but is not limited to: Quality assurance of dose during first/weekly/every fractions measured on patient's skin, Quality assurance of dose at the site of the tumor, Quality assurance of dose at the site of organ at risk, Investigative dosimetry during novel applications and clinical trials including dose escalation and hypofractionation (SBRT), alternative delivery techniques (VMAT), gated delivery (monitoring organ motion and breathing), Brachytherapy for permanent seed implants (prostate, breast), Brachytherapy for high-dose-rate applications (prostate, esophagus, lung, cervix) both in organs at risk and tumor tissue, Novel MR-guided techniques (MR-guided HDR for prostate, MR-guided LINACs, MR-guided cobalt units, etc.).

There is a clinical need for monitoring of dose delivered to patients during radiotherapy procedures to treat oncological disease. Ideally the radiation dose measured at any point in the patient should be as per the treatment plan in order for the treatment to be successful (defined as control of oncological disease with minimal acute and long-term side-effects). The current standard for radiation treatment typically consists of imaging, planning the treatment based on the 3-D volumetric (sometimes 2-D projection) imaging data, followed by treatment. Variables such as internal and external motion, patient placement, dose calculation inconsistencies and human error have been identified as causes of misdelivery of the ideal planned treatment. Radiotherapy quality assurance (i.e. ensuring delivered dose is as planned at any point) is needed by radiation oncologists and physicists. However, implementing this step on every patient with the current commercially available tools is complex and expensive. This is complicated further by the growing field of MR-guided radiotherapy and MR-guided brachytherapy (MRgRT) which requires MR-compatible QA tools.

Current commercially-available in-vivo dosimeters include TLD's (thermo-luminescent dosimeters), MOSFET's (Metal Oxide Semiconductor Field Effect Transistors) diodes, ion-chambers, and scintillators (see "Competitive and Complementary Technology Landscape"). All of these technologies (except TLD's and scintillators) rely on electronic readout of either accumulated charge, induced current, or a change in bias voltage. Performing such measurements requires metallic conducting components within the dosimeter and signal conduit (e.g. wire), which are generally of high atomic number (Z). As a result these components interact with the ionizing radiation field in a much different way than the tissue it displaced, thus altering the dose distribution within the patient. For diodes this issue can create as much as a 30% error to local dose distribution due to their size, density and composition. Although MOSFET dosimeters are much smaller (i.e. ~1-2 mm) they still exhibit non-tissue equivalence and thus must be calibrated at the exact beam energy in which they will be used (which is not always known a-priori). This complicates and prolongs work-flow and may yield incorrect results.

SUMMARY

It is an object of the present invention to provide an optical dosimeter and a method of manufacture of an optical dosimeter which addresses at least one of the above concerns.

According to one broad aspect of the present invention, there is provided a fiber optic dosimeter probe for sensing radiation dose comprising: an optical fiber having a free end and a sensitive end, a window having a sensitive side and a rear side; a radiation sensitive layer between the sensitive end of the optical fiber and a sensitive side of the window, the radiation sensitive layer being made of a material having an optical property that changes with absorbed radiation dose, an amount of the material corresponding to a predetermined sensitivity to radiation; wherein the window and the optical fiber have a near water equivalent interaction with radiation and are MR compatible.

In one embodiment, the window is at least one of a substrate layer, a flexible window, a reflector, a dielectric mirror, a multilayer dielectric mirror and a poly-electrolyte multilayer assembly.

In one embodiment, the material of the radiation sensitive layer is a radiochromic material.

In one embodiment, the probe further comprises a biocompatible sheath having a near water equivalent interaction with radiation, the sheath covering the radiation sensitive layer, the window and at least partly the optical fiber.

In one embodiment, the probe further comprises an adhesive to assemble the window to the optical fiber provided with the radiation sensitive material, the adhesive having a near water equivalent interaction with radiation.

In one embodiment, the radiation is an ionizing radiation across one energy chosen from a range of x-ray, γ-ray, and electron energies.

In one embodiment, the optical fiber is a plastic optical fiber having a numerical aperture chosen to be between 0.10 and 0.65.

In one embodiment, the probe further comprises a fiducial, the fiducial including a metallic band with a Z number higher than a Z number of water and a Z number of the probe, the fiducial being positioned away from the radiation sensitive layer.

In one embodiment, the fiducial is made of an MR-contrast material.

In one embodiment, the radiation sensitive layer and the window are separated by a length of optical fiber and wherein the window is made of a MR-contrast material to provide the fiducial.

In one embodiment, the probe is connected to a dosimetry system, the dosimetry system including a light source emitting light at at least one wavelength, a light detector, a coupler connected to the light source and the light detector, at least one light guide connected to the coupler at one end, one of the at least one light guide being connected to, at another end, the free end of the optical fiber.

In one embodiment, the probe further comprises a second optical fiber having a free end and a sensitive end, the sensitive end being affixed to the rear side of the window; a biocompatible capillary having a near water equivalent interaction with radiation, the capillary covering the radiation sensitive layer, the window and at least partly the optical fiber and the second optical fiber, the capillary being affixed to the probe using an adhesive material.

In one embodiment, the optical fiber and the second optical fiber are separated sections of a single optical fiber.

According to another broad aspect of the present invention, there is provided a method for fabrication of a fiber optic dosimeter probe, comprising: providing a radiochromic radiation sensitive material; providing an optical fiber having a core; providing a reflector of a size at least equal to a size of the core of the optical fiber; depositing and attaching the radiochromic radiation sensitive material between the optical fiber and the reflector to form an assembled probe, the radiochromic radiation sensitive material having a thickness corresponding to a predetermined sensitivity to radiation; wherein the reflector and the optical fiber have a near water equivalent interaction with radiation and are MR compatible.

In one embodiment, the attaching comprises at least one of assembling, adhering, and consolidating.

In one embodiment, the depositing and attaching comprises depositing the radiation sensitive material onto one of the optical fiber and the reflector.

In one embodiment, the depositing comprising one of spin coating, doctor blading, dip coating.

In one embodiment, the thickness is smaller than 20 μm.

In one embodiment, the optical fiber has at least one of an exposed tip, a polished tip, and an ultrasound cleaned tip.

In one embodiment, the method further comprises providing a second optical fiber; providing a biocompatible capillary having a near water equivalent interaction with radiation, the biocompatible capillary having an insertion hole; wherein the depositing and attaching the radiochromic radiation sensitive material between the optical fiber and the reflector includes inserting the optical fiber within the capillary from one end, inserting the second optical fiber within the capillary form another end, aligning the insertion hole between the optical fiber and the second optical fiber, inserting the radiation sensitive material and the reflector between the optical fiber and the second optical fiber through the insertion hole, using an adhesive material to affix the radiation sensitive material to the reflector, the optical fiber and the second optical fiber.

According to another broad aspect of the present invention, there is provided a method for fabrication of a capillary fiber optic dosimeter probe, comprising: providing a radiochromic radiation sensitive material, the radiochromic radiation sensitive material having a thickness corresponding to a predetermined sensitivity to radiation; providing an optical fiber having a core; providing a second optical fiber; providing a biocompatible capillary having a near water equivalent interaction with radiation, the biocompatible capillary having an insertion hole; inserting the optical fiber within the capillary from one end; inserting the second optical fiber within the capillary form another end; aligning the insertion hole between the optical fiber and the second optical fiber; inserting the radiation sensitive material between the optical fiber and the second optical fiber through the insertion hole, using an adhesive material to affix the radiation sensitive material to the optical fiber and the second optical fiber; wherein the optical fiber and the second optical fiber have a near water equivalent interaction with radiation and are MR compatible.

In one embodiment, the method further comprises adhering the radiochromic radiation sensitive material to a substrate prior to the inserting.

According to another broad aspect of the invention provides a real-time in vivo fiber optic dosimeter probe for sensing radiation dose. The dosimeter probe includes an optical fiber. A radiation sensitive layer is provided on one end of the optical fiber. The fiber side of the radiation sensitive layer is in contact with a probe end of the optical fiber. The radiation sensitive layer is made of a material which has an optical property that changes with absorbed radiation dose. An amount of the material corresponds to a predetermined sensitivity to radiation. A reflector is provided on a reflector side of the radiation sensitive layer. The reflector side is opposed to the fiber side. The reflector and the optical fiber have a near water equivalent response to radiation. The reflector and the optical fiber are chosen to be MR-compatible.

In one embodiment, there is provided a real-time in vivo fiber optic dosimeter probe for sensing radiation dose comprising: an optical fiber, radiation sensitive material, reflector, and a protective coating.

In one embodiment, there is provided an optical dosimetry system comprising of light source, light detector, a fiber optic coupler connected to light source and light detector, a light guide connected to coupler and interfacing with the fiber optic dosimeter probe.

In one embodiment, the optical dosimetry system may comprise of a plurality of interfaces with a plurality of fiber optic dosimeter probes/detectors for simultaneous measurements at several points.

In one embodiment, multiple wavelengths are used for readout.

In one embodiment, the radiation sensitive material has optical property that changes with absorbed radiation dose and the change in optical property can be detected with interrogating light, therefore making it a modified signal light.

In one embodiment, the radiation sensitive material may be a radiochromic material that would modify the interrogating light into a signal light.

In one embodiment, the optical fiber has one end attached to the radiation sensitive material and another end to a light guide, and the fiber is used to pass interrogation light to the radiation sensitive material and modified signal light from the radiation sensitive material.

In one embodiment, the optical fiber is chosen to provide water equivalent response to ionizing radiation across a wide range of x-ray, γ-ray, and electron energies.

In one embodiment, the optical fiber is chosen to be void of ferromagnetic components and be compatible with strong static and fluctuating magnetic fields.

In one embodiment, the optical fiber is chosen to be both water equivalent and non ferromagnetic.

In one embodiment, the reflector is on the opposite end of the radiation sensitive material from the end attached to the fiber.

In one embodiment, the reflector is chosen to provide water equivalent response to ionizing radiation across a wide range of x-ray, γ-ray, and electron energies.

In one embodiment, the reflector is chosen have no ferromagnetic components and be compatible with strong static and fluctuating magnetic fields.

In one embodiment, the reflector is both water equivalent and non ferromagnetic.

In one embodiment, the reflector is a multilayer dielectric mirror.

In one embodiment, the fiber optic dosimeter probe may be encased within a biocompatible sheath having a radiation response nearly water equivalent.

In one embodiment, an adhesive is provided to assemble the reflector to the optical fiber provided with the radiation sensitive material, the adhesive having a radiation response nearly water equivalent.

In one embodiment, the appropriate and predetermined amount of radiation sensitive material is deposited onto a reflector to yield a fiber optic dosimeter probe with desired sensitivity.

In one embodiment, the radiation sensitive material is deposited onto a reflector by a doctor blading method.

In one embodiment, the radiation sensitive material is deposited onto a reflector by spin coating method.

In one embodiment, the radiation sensitive material is deposited onto a reflector by dip coating method.

In one embodiment, the dielectric mirror is a poly-electrolyte multilayer assembly.

In one embodiment, the radiation sensitive material deposited onto a reflector is positioned onto a tip of an optical fiber.

In one embodiment, the radiation sensitive material, reflector and optical fiber are at least one of assembled, adhered, and consolidated.

In one embodiment, the appropriate and predetermined amount of radiation sensitive material is deposited onto an optical fiber and the reflector is deposited onto the radiation sensitive material.

According to another broad aspect of the present invention, there is provided a fiber optic dosimeter probe for sensing radiation dose comprising: an optical fiber, a radiation sensitive layer affixed to and sandwiched between one end of the optical fiber and a reflector, the radiation sensitive layer being made of a material having an optical property that changes with absorbed radiation dose, an amount of the material corresponding to a predetermined sensitivity to radiation; wherein the reflector and the optical fiber have a near water equivalent interaction with radiation, wherein the reflector and the optical fiber are MR compatible.

In one embodiment, the material of the reflector and the material of the optical fiber allow to maintain geometric integrity of MR images such that accurate localization of the radiation sensitive layer is possible on the MR images.

In one embodiment, the material of the reflector and the material of the optical fiber generate a minimum perturbation of the local field.

In one embodiment, the material of the reflector and the material of the optical fiber can be safely used on patients by limiting a length of conducting components such that it is insufficient to induce heating from the RF system.

In one embodiment, the probe further comprises a protective coating, the protective coating being applied over the reflector, the radiation sensitive material and at least the probe end of the optical fiber.

In one embodiment, the radiation sensitive material is a radiochromic material.

In one embodiment, the reflector and the optical fiber are adapted to withstand strong static and fluctuating magnetic fields.

In one embodiment, the reflector is a multilayer dielectric mirror.

In one embodiment, the radiation sensitive layer is deposited onto the reflector by a doctor blading method.

In one embodiment, the radiation sensitive layer is deposited onto the reflector by a spin coating method.

In one embodiment, the radiation sensitive layer is deposited onto the reflector by a dip coating method.

In one embodiment, the radiation sensitive layer is deposited onto the optical fiber and the reflector is deposited onto the radiation sensitive layer.

In one embodiment, the probe is adapted for use in in-vivo conditions.

In one embodiment, the radiation sensitive layer is affixed to the reflector by spin coating and wherein the radiation sensitive layer deposited on the reflector by the spin coating is then affixed to the optical fiber using an adhesive.

In one embodiment, the plastic optical fiber has a numerical aperture chosen to be between 0.10 and 0.65.

In one embodiment, the reflector is flexible.

In one embodiment, the reflector is a dielectric mirror.

In one embodiment, the probe is connected to a dosimetry system, the dosimetry system including a light source, a light detector, a coupler connected to the light source and the light detector, a light guide connected to the coupler at one end and the optical fiber at another end to interface with the fiber optic dosimeter probe.

In one embodiment, a fiducial is provided in the dosimeter probe, the fiducial including a metallic band with a higher Z number than water and the rest of the probe, positioned sufficiently far away from the dosimetric medium.

In one embodiment, the fiducial can be of MR-contrast material.

In one embodiment, the reflective medium is a fiducial.

According to still another broad aspect of the present invention, there is provided a method for fabrication of a fiber optic dosimeter probe, comprising: providing a radiochromic radiation sensitive material in fluid form; providing a plastic optical fiber having a core; providing a reflector of a size at least equal to a size of the core of the optical fiber; spin coating the radiochromic radiation sensitive material on the reflector material to obtain a coated reflector having a hardened radiochromic thin film of a desired thickness applied to the reflector material; attaching the coated reflector to a tip of the plastic optical fiber to form an assembled probe.

In one embodiment, the spin coating includes obtaining a desired thickness of between 1 and 1000 µm, for example a thickness of 15 µm.

In one embodiment, the method further comprises exposing the tip of the plastic optical fiber prior to the attaching.

In one embodiment, the method further comprises polishing the plastic optical fiber tip In one embodiment, the method further comprises using an ultrasound batch to clean the plastic optical fiber tip.

In one embodiment, the method further comprises attaching the reflector material to a rigid substrate for support during spin coating.

In one embodiment, the spin coating is carried out during a period of time chosen between 3 and 20 seconds.

In one embodiment, the spin coating is carried out at a rotation speed chosen between 200 and 1000 rpm.

In one embodiment, the method further comprises cutting the reflector to a desired size after the spin coating.

In one embodiment, the attaching the coated reflector comprises applying an adhesive to the exposed tip and placing the coated reflector in aligned contact with the adhesive and drying the assembled probe.

In one embodiment, applying the adhesive includes applying an epoxy.

In one embodiment, the attaching further comprises placing the coated reflector on a non-adhesive surface.

In one embodiment, the method further comprises providing a protective coating on the assembled probe.

In one embodiment, the providing the protective coating comprises applying adhesive on the tip, the coated reflector and at least a portion of the plastic optical fiber and drying.

According to still another aspect of the present invention, there is provided a fiber optic dosimeter probe obtained using the method of fabrication described above.

BRIEF DESCRIPTION OF THE DRAWINGS

Having thus generally described the nature of the invention, reference will now be made to the accompanying drawings, showing by way of illustration a preferred embodiment thereof and in which FIG. 1 is a block diagram of an application of an exemplary embodiment of a radiation dosimeter system in accordance with the invention;

FIG. 2 is a schematic representation of a fiber optic dosimeter probe;

FIG. 3A, FIG. 3B, FIG. 3C show examples of fiber optic dosimeter probes provided with fiducials, in FIG. 3A, two fiducials are provided within the probe, in FIG. 3B, one fiducial is provided and the reflector is spaced apart from the sensitive material, in FIG. 3C, multiple fiducials are provided;

FIG. 4A shows an example fiber optic dosimeter probe made with a capillary working in reflection mode with a reflector while FIG. 4B shows an example fiber optic dosimeter probe made with a capillary working in transmission mode without a reflector;

It will be noted that throughout the appended drawings, like features are identified by like reference numerals.

DETAILED DESCRIPTION

Figure 4A:
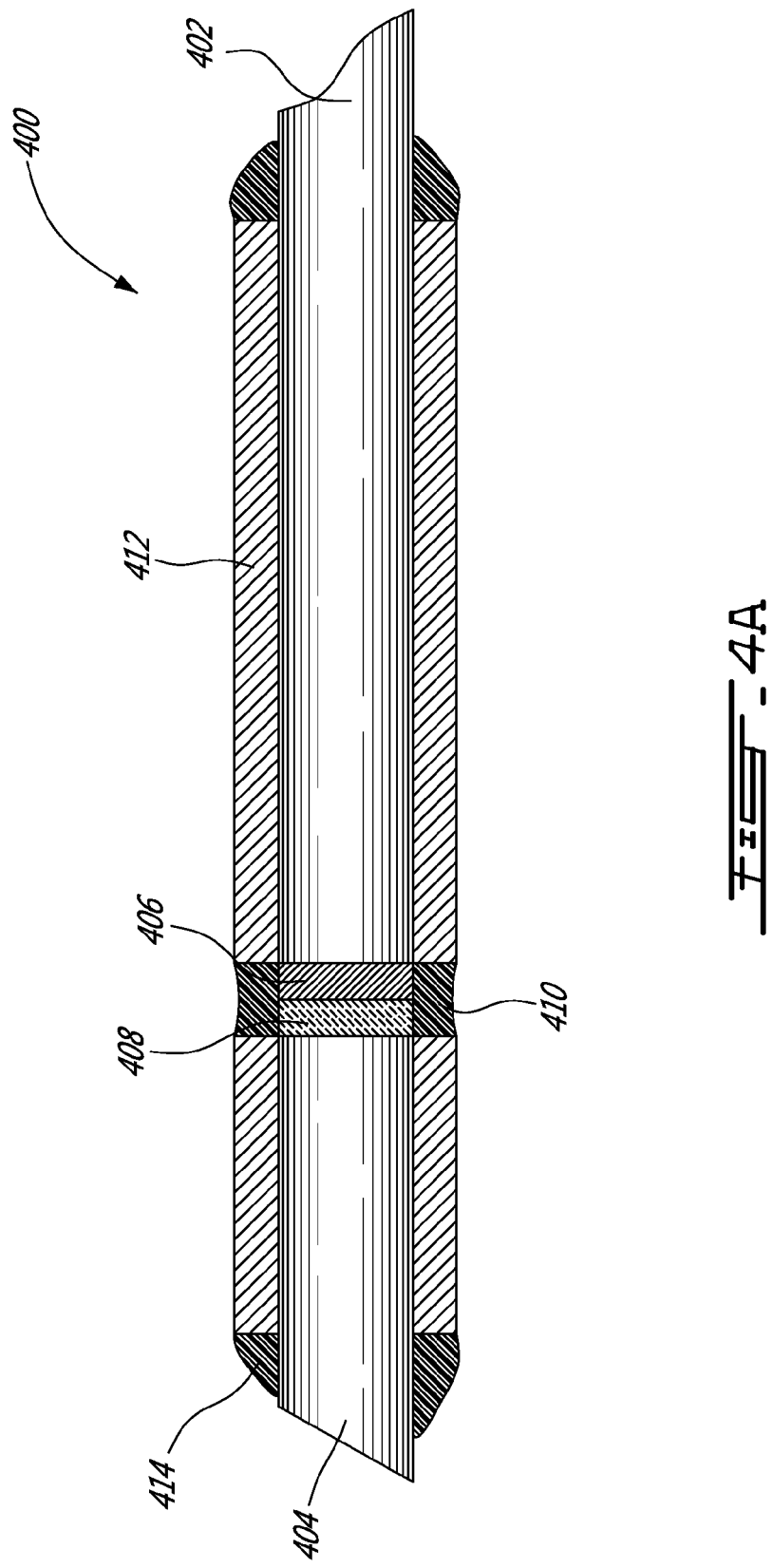

It will be appreciated that for simplicity and clarity of illustration, elements shown in the figures have not necessarily been drawn to scale. For example, the dimensions of some of the elements may be exaggerated relative to other elements for clarity. Further, numerous specific details are set forth in order to provide a thorough understanding of the invention. However, it will be understood by those of ordinary skill in the art that the invention may be practiced without these specific details. In other instances, well-known methods, procedures and components have not been described in detail so as not to obscure the invention.

The proposed dosimeter is a fiber optic dosimeter probe using a radiochromic thin film on a dielectric mirror. The radiochromic material can be deposited as a thin film directly on the dielectric mirror and then assembled on the tip of the optical fiber. The optical sensor probe operates in transmission/reflection mode to detect and quantify dose from x-ray or electron beams. It has MR-compatible features, water-equivalent composition and real-time readout. In one example embodiment, it can be void of a ferromagnetic component. The optical fiber used in an example embodiment is a plastic optical fiber.

If a material is MR compatible, it allows to maintain geometric integrity of images such that accurate localization of a dosimetric medium is possible, and to generate a minimum perturbation of the local field. Furthermore, is can be safely used on patients by limiting the length of the conducting components such that it is insufficient to induce heating from the RF system.

The term "water-equivalent" is intended to qualify a material or composition which interacts with an ionizing radiation within an acceptable range similar to the interaction of water with the same ionizing radiation. It should be noted that water-equivalency depends on the energy of the ionizing radiation so a material can be determined to be water-equivalent over a specific range of operating conditions. Non-water-equivalent materials may alter the radiation actually delivered to the treatment site, possibly significantly, as well as the measurement of this radiation. Electronic components include metals that have a high atomic number and consequently are not water-equivalent.

A radiochromic substance of controlled and uniform thickness is attached onto the end of an optical fiber. The thickness can be adjusted for various usage/radiation dosage ranges (i.e. 15 µm thickness corresponds to a 5 to 1000 cGy range dose detection). A series of plug- and play fiber probes having variable sensitivity ranges can be chosen based on the specific application. An example range for the thickness of the radiochromic substance is 1 µm to 100 µm. The former would yield a very low sensitivity but high dynamic range measurements. A 100 µm thickness still yields "high resolution" measurements compared to other dosimeters.

Alternatively, a 15 µm thickness may correspond to 5-5000 cGy range dose detection by using a chosen spectral range that increases with the dose, in order to extend the dynamic range of the dosimeter. Thus the range of the dosimeter can automatically be adjusted by the readout software, while keeping the manufacturing and quality control of probes constant.

The dosimeter can be prepared by adhesion of a radiochromic solution (active material) on top of a reflective material (i.e. a dielectric layer) which is positioned on a plastic fiber. The fiber sensor should not interfere with an MR signal (it should therefore be MR compatible).

The use of a plastic fiber that is disposable after a single use offers a feature of sterility.

Referring first to FIG. 1, shown therein is a block diagram of an application of an exemplary embodiment of a radiation dosimeter system 110. The radiation dosimeter system 110 comprises an analysis unit 112 within a processing assembly 114 and at least one radiation dosimeter 116. The analysis unit 112 is connected to the processing assembly 114 by an electrical cable 118 and each radiation dosimeter 116 is preferably connected to the processing assembly 114 via an optical fiber cable 120 (note for simplicity of description only one radiation dosimeter 116 and one optical fiber cable 120 have been labeled). In this exemplary embodiment, the analysis unit 112 may be a computer or other suitable processing device. All optical fiber cables 120 are connected in a multi-channel connector 126; the multi-channel connector 126 may be a suitable optical multiplexing device, as is commonly known to those skilled in the art.

The processing assembly 114 includes a light source 122 and a light detector 124. In this exemplary embodiment, the light source 122 may be a suitable light emitting diode or the like, as is commonly known to those skilled in the art. The light detector 124 may be a photodiode, a spectrophotometer, a photomultiplier tube with appropriate filter(s) and the like.

The multi-channel connector 126 is optional and may be employed to enable the use of multiple radiation dosimeters 116. The multi-channel connector 126 can switch between individual radiation dosimeters 116, sending and receiving optical signals from each in turn. Alternatively, light from the light source 122 may be provided to all of the radiation dosimeters 116 concurrently, and the multi-channel connector 126 controls the signal going to the light detector 124. Another possibility is the use of a multi-channel spectrophotometer for the light detector 124 which may allow for continuous signal collection for multiple radiation dosimeters simultaneously. Several radiation dosimeters 116 may be used to measure dose in several small volumes within the patient, whether these small volumes are within the volume to be treated (i.e. tumor) or in the peripheral organs (where high dose is to be avoided if unnecessary). Also, two dosimeter probes could be used in parallel to help confirm the readings, if both placed in near-zero dose gradient regions.

The analysis unit 112 commands the light source 122 to generate an optical interrogation signal which is sent to one or more of the radiation dosimeters 116 via the multi-channel connector 126. The radiation dosimeters 116 are located at a suitable location on a patient receiving radiation. The multi-channel connector 126 provides the optical interrogation signal to each of the radiation dosimeters 116 that are in use and receives an optical information signal in return. The transmission of the optical interrogation signal and the reception of the optical information signal are accomplished via the optical fiber cable 120 which includes appropriate transmission optical fibers. The optical information signals are sent to the light detector 124 where they are transduced and converted to corresponding electrical information signals and sent to the analysis unit 112 for analysis by the analysis and Display unit 143. Other splitter arrangements could be made.

In use, the processing assembly 114 is placed outside of a treatment room 132 in which a radiation source 134 provides ionizing radiation 136 to a patient 138. The patient 138 typically lies on a table or "couch" 140 during treatment. The analysis unit 112 is located exterior to the treatment room 132 on the other side of a radiation barrier 142 so that a medical practitioner can interact with a radiation measurement software program (analysis and display unit 143) and use the radiation dosimeter system 110 to determine the amount of radiation that is delivered to one or more locations on/within the patient 138 during treatment. The radiation dosimeter system 110 can provide this information in real-time. In an alternative embodiment, the processing assembly 114 may also be located inside the treatment room 132.

In alternative embodiments, the elements of the radiation dosimeter system 110 may be arranged differently from the arrangement shown in FIG. 1. For instance, the light source 122, light detector 124 and the connector 126 may be separate elements that are not contained within one physical housing. Further, the analysis unit 112 may be contained within the treatment room and may receive and send signals from a computer located outside of the treatment room that is operated by the medical practitioner. In one case, the analysis unit 112 may also be part of the processing assembly 114. Various alternative configurations are available as is well known to those skilled in the art.

It will be readily understood that the fiber optic dosimeter probe could be packaged as a bundle of fiber optic probes provided within a sheath. The bundle would include a sensor array. The fiber optic probes of the bundle could measure at different location along the length of the bundle by having their dosimetric material located at different positions.

As shown in FIG. 2, the proposed real-time in vivo fiber optic dosimeter probe 200 for sensing radiation dose comprises an optical fiber 202. In one embodiment, the fiber optic dosimeter probe 200 has a maximum outer diameter of 1 mm and has a minimum radius of curvature of 10 mm.

A radiation sensitive layer 204 is sandwiched between the end of the optical fiber 208 and a reflector 206. The fiber side 212 of the radiation sensitive layer 204 is therefore in contact with a probe end 208 of the optical fiber 202. The radiation sensitive layer 204 is made of a material which has an optical property that changes with absorbed radiation dose. An amount of the material corresponds to a predetermined sensitivity to radiation. The reflector 206 is provided on a reflector side 210 of the radiation sensitive layer 204. The reflector side 210 is opposed to the fiber side 212. The reflector 206 and the optical fiber 202 have a water equivalent response to radiation. The reflector 206 and the optical fiber 202 are MR compatible.

A protective coating 214 encompasses the tip of the fiber 208 provided with the radiation sensitive layer 204 and the reflector 206.

The radiochromic thin film of the proposed dosimeter is made of a radiochromic material. Three such radiochromic materials are proposed herein as examples of suitable materials for the radiochromic thin film, namely suspensions used in commercial GafChromic® MD-55, and EBT or EBT-2 radiochromic thin films. Other radiochromic materials could be used. The sensitive material in the commercial film consists of a suspension of monomers within a gelatin base, arranged such that their carbon-carbon triple bonds are approximately 4 Angstroms from each other—a favorable distance for propagation of polymerization. Upon exposure to ionizing radiation, heat or pressure, polymerization is induced and it proceeds along the chain of monomers, creating a mixture of polymers and monomers within a single arrangement of molecules. The absorbers are the conjugated double and triple carbon-carbon bonds running along the polymer backbone. The change in optical density over a given range of wavelengths becomes an indicator of the increase in amount of polymers in the monomer-polymer mixture, and is thus an indicator of absorbed dose. These materials' optical density signal increases with dose as the radiation is being applied, and thus they are suitable for real-time dosimetry. Because this read-out process is passive and non-destructive—the polymers do not dissociate due to interrogation light passing through—the measurements can be taken even when very little or no dose is being deposited, providing true real-time cumulative and permanent feedback.

These radiochromic materials can be made near water-equivalent over a wide range of energies and have a high dose resolution, detecting as low as 5 cGy with only 32 m thickness of material in a transmission measurement, and a spot size of ~500 µm in diameter. The dose sensitivity can be increased even further by simply increasing the thickness of the material, while still maintaining an acceptably small overall size. The optical density as a function of dose shows a linear increase with dose for MD-55 medium up to a dose of ~50 Gy, and a third-order polynomial increase with dose for EBT and EBT-2 up to a dose of ~10 Gy, when interrogated over the main absorbance peak.

The materials of the probe surrounding the dosimetric medium and medium itself have components such that the dosimetric response (generated signal) is proportional to the dose absorbed by a specific type of material across a clinically relevant range of energies (for example 20 kVp to 25 MVp beams) The specific type of material in question is water ($Z_{eff}$=7.4) (but could be tissue, bone, etc.), thereby making the material "water-equivalent". The proportionality of signal (e.g. netOD) to dose should be constant (e.g. ±5%) across the relevant range of energies.

Direct deposition techniques can be used to provide the radiochromic thin film on the plastic optical fiber (POF). Examples of such techniques follow. These techniques could be used alone or in combination. Some of the techniques are:

dip coating of a radiochromic material on the POF tip and then dip coating of a dielectric mirror;

dip coating of a radiochromic material along a plastic optical fiber (POF) for which the cladding is removed and then dip coating of a dielectric mirror at the POF tip;

dip coating of a radiochromic material on the POF tip followed by assembly of a corner cube mirror;

cutting of the radiochromic thin film and assembly on the POF tip followed by a dielectric mirror;

use of an Al mirror on a POF tip at a distance away from the radiochromic thin film;

spin coating of the radiochromic material on a dielectric mirror, die, shear, or laser cutting and assembly onto the POF tip;

other deposition techniques like roll coating, spray coating, printing, painting, and the like.

Different mirror materials can be used, including reflection holograms, and for example the 3 M Vikuiti ESR multi-layer polymer dielectric mirrors.

The most common method of spreading a sample of radiochromic thin film is with a film applicator, also called a drawdown bar or doctor blade. A typical blade type applicator consists of a metal bar containing a gap of known depth or clearance on one or more faces. It is then placed at one end of the drawdown card and a sufficient volume of sample is placed in front of the applicator. The applicator is then "drawn down" the chart, leaving a uniform thin film behind it. The doctor blade technique has a minimal material loss and was primarily developed for large area thin film production. Such a doctor blade can be used to spread the radiochromic thin film on a 3M Vikuity mirror.

Dip coating is an industrial process that is used to produce thin films. The substrate is immersed in the solution of the coating material at a constant speed. The substrate remains inside the solution for a period of time and then starts to be pulled up. The thin layer deposits itself on the substrate while it is pulled up. The withdrawing is carried out at a constant speed to avoid any judders. The speed determines the thickness of the coating. Excess liquid is drained from the surface. The solvent evaporates from the liquid, forming the thin layer. For volatile solvents, such as alcohols, evaporation starts already during the deposition & drainage steps. The POF tip substrate can be dip coated with the radiochromic solution.

Spin coating is a procedure used to apply uniform thin films to flat substrates. In short, an excess amount of a solution is placed on the substrate, which is then rotated at high speed in order to spread the fluid by centrifugal force. Rotation is continued while the fluid spins off the edges of the substrate, until the desired thickness of the thin film is achieved. The applied solvent is usually volatile, and simultaneously evaporates. The higher the angular speed of spinning, the thinner the thin film. The thickness of the thin film also depends on the concentration of the solution and the solvent. Radiochromic thin films can be spin coated on 3M Vikuiti™ ESR mirrors, for example. A thickness of 1 to 100 µm can be achieved, for example a thickness of 15 µm can be used. The sections of coated reflectors are then die, shear, or laser cut and adhered to the POF tip.

The dielectric mirror can be a Vikuiti™ Enhanced Specular Reflector (ESR) which has an ultra-high reflectivity to create a mirror-like optical enhancement thin film. It has a non-metallic thin film construction.

An example of the adhesive used in the present embodiment is EPO-TEK® 302-3M by Epoxy Technology, Inc. which is a two component epoxy which can be used for adhesive joining, sealing, potting or as a coating. It is an optically transparent epoxy. This epoxy should be near water-equivalent to radiation in the ranges required. This epoxy can also be used to provide a protective coating on the whole probe. This epoxy is bio-compatible, and it has very good autoclave resistance. It can be used for adhesion to stainless steel metal, ceramic, titanium and most plastics. It is USP Class VI bio-compatible.

It should be noted that although the dosimeter probe of the present invention can be disposable, hospitals could keep probes for traceability and for re-measuring purposes.

A positioning guide can optionally be provided in the dosimeter probe. FIG. 3A shows such an example embodiment of the probe 300 made with a fiber optic 302 having a core 304 and a cladding 306. The sensitive material 308 is present in the core. The reflector 310 sandwiches the sensitive material 308 and the fiber optic 302. A casing 312 encompasses the tip of the fiber optic 302. A metallic band with a higher Z number than water and the rest of the probe, herein referred to as a "marker" or "fiducial" 314, 316 is positioned sufficiently far away from the sensitive material to be used as a positioning guide on the x-ray/CT. The marker can be of MR-contrast material, such that MRI can be used to verify position as well. Marker material can be air, ferromagnetic, paramagnetic, high-Z, differential density, or radioactive, as long as it is sufficiently far away to not interfere with the measurement and to still allow MR-compatibility. Gadolinium is an example of a material that could be used for the fiducial. None, one or both of fiducials 314 and 316 can be present in the probe.

An alternative configuration shown in FIG. 3B is to have the reflective medium 318 be the high-Z fiducial itself, but not be close to the dosimetric medium. Aluminum can then be used for the reflective medium 318 because it is located away from the sensitive medium 308.

Yet another alternative is to provide a series of fiducials 320, 322, 324, 326, 328, 330 at specified and known distances apart (a and b in FIG. 3c), and at specified and known distance from the dosimetric medium 308 (d) such that the position of the medium 308 can be deduced from images of the fiducials 320, 322, 324, 326, 328, 330.

The spacing between fiducials 320, 322, 324 (a and b) need not be equidistant; as long as dimensions are known, and the closest fiducial is far enough away from dosimetric medium 308 as to not interfere with the measurement, or local image.

FIG. 4A shows an example fiber optic dosimeter probe 400 made with a capillary and working in reflection mode. Probe 400 has two optical fibers 402 and 404, for example 500 μm plastic optical fibers which surround the sensitive material 406, for example a radiochromic film and the reflector 408, for example an ESR mirror. The fibers 402, 404 are inserted within a capillary 412 which is perforated 410, the insertion hole 410 allowing to introduce the sensitive material 406 and the reflector 408 between the fibers 402, 404. An adhesive 414 is used to assemble all components together.

In FIG. 4B, the example fiber optic dosimeter probe 420 made is for use in transmission mode. It does not have a reflector 408.

Example 1

An example of a fabrication process for the dosimeter probe is as follows. A radiochromic thin film was spin coated on a 3M Vikuiti™ ESR mirror using a Solitec spin coater. The ESR mirror being flexible, a piece of about 25 mm by 25 mm was affixed on a glass substrate to avoid any deformation due to the vacuum that holds the substrate in place during the spinning. The quantity of radiochromic fluid used was 150 μl, and the rotation speed was set to 730 rpm for the duration of 11 seconds, yielding an average thickness of the desired 15 μm. A ESKA® acrylic fiber developed and manufactured by Mitsubishi was used. The core diameter was 486 μm, the fiber diameter was 500 μm and the numerical aperture was 0.51. The unjacketed plastic optical fiber (POF) was cut to 1.05 m length to ensure the final length is 1 m. One end of the plastic fiber was connectorized with a SMA connector. On the probe side, the plastic fiber was polished. If necessary, an ultrasound bath was used to clean the POF (probe side). Using an X-Y-Z-θ translation stage, a fiber optic holder, and a binocular, the mirror is adhered with EPO-TEK® 302-3M to the POF tip. The POF was inserted into a holder attached to a 6 axis nanoPositionner. A 1 mm×1 mm piece of the radiochromic thin film coated mirror was cut, and the piece was put on a non-adhesive surface (e.g. Teflon).

The POF was aligned with the thin film/mirror. The adhesive was put on the POF, and it was lowered onto the thin film/mirror. The assembly was cured or polymerized for 6 to 8 hours. A protective coating was put on the assembly of POF and thin film/mirror and the coated assembly was further cured or polymerized for another 6 to 8 hours. The fiber optic dosimeter probe was then packaged.

Example 2

A real-time fiber optic dosimeter probe was fabricated by spin coating, to a 8.5 μm thickness of a radiochromic radiation sensitive material on a dielectric mirror. The material was then cut as a slice of about 2 cm long and 500 μm wide. A 1 mm long poly(methyl methacrylate) capillary having an outer diameter of 1 mm and an inner diameter of 500 μm was cut 1 cm long. A 500 μm side hole was drilled through the capillary near the center; the capillary was held in a fiber optics holder and the radiation sensitive slice was slipped through the capillary side hole. Two polished ends of 500 μm plastic multi-mode optical fibers were inserted in both ends of the capillary and firmly pressed on the radiochromic coated mirror. Small drops of a cyano-acrylate adhesive were used to affix both fibers at the capillary ends. A low viscosity epoxy adhesive was finally prepared and injected in the side holes of each probe to affix the radiochromic element on the optical fibers and match the refractive indexes. After room temperature curing of the epoxy adhesive, all protruding parts (radiochromic element and one optical fiber) were cut.

A transmission probe was further fabricated as above except that the radiochromic film was deposited on a poly (ethylene terephthalate) transparent window and none of the optical fibers were cut.

Example 3

Figure 5:
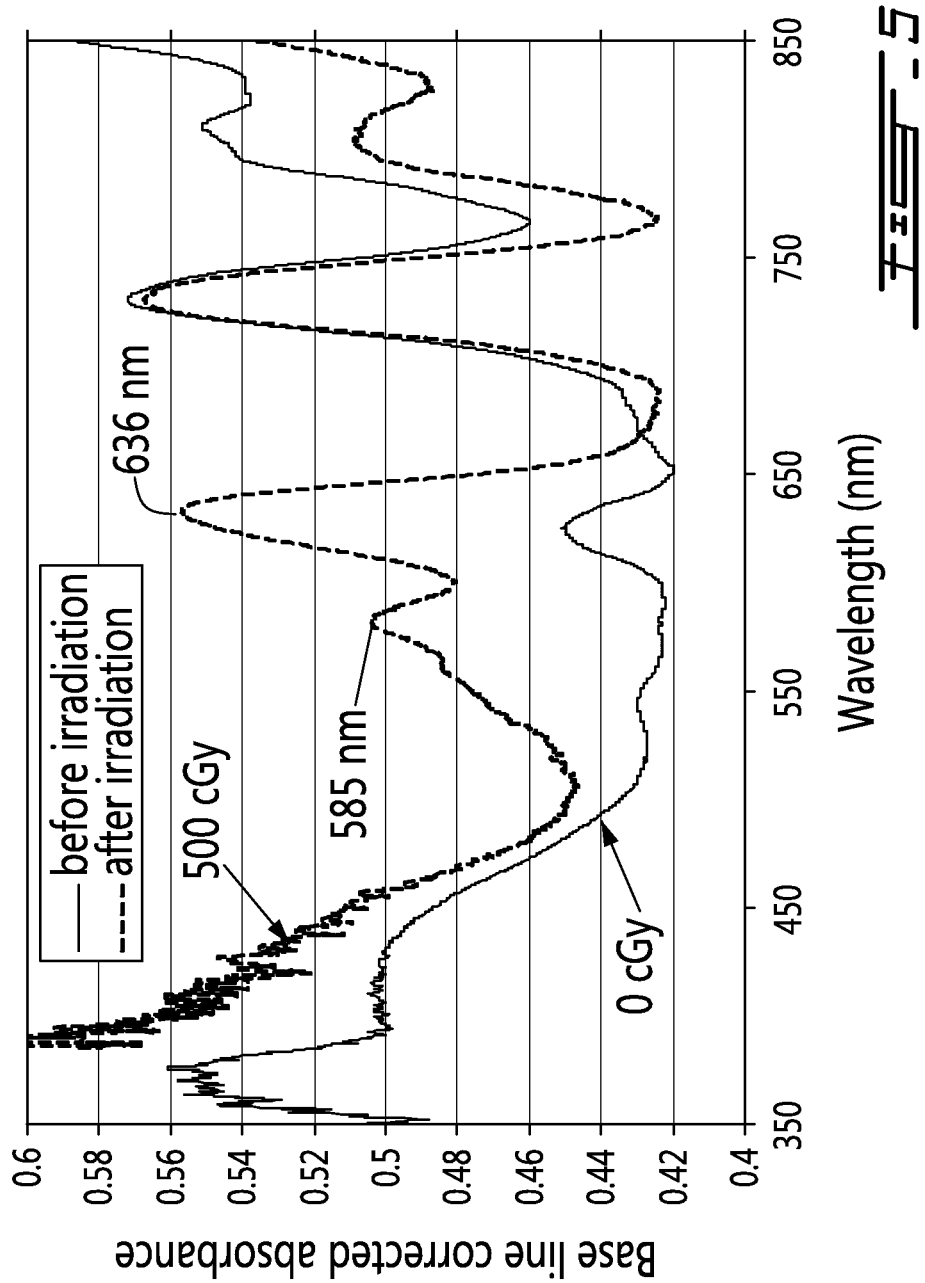
FIG. 5 is a graphical representation of the absorbance spectra of a first example probe before and after being irradiated to 500 cGy.
Figure 6:
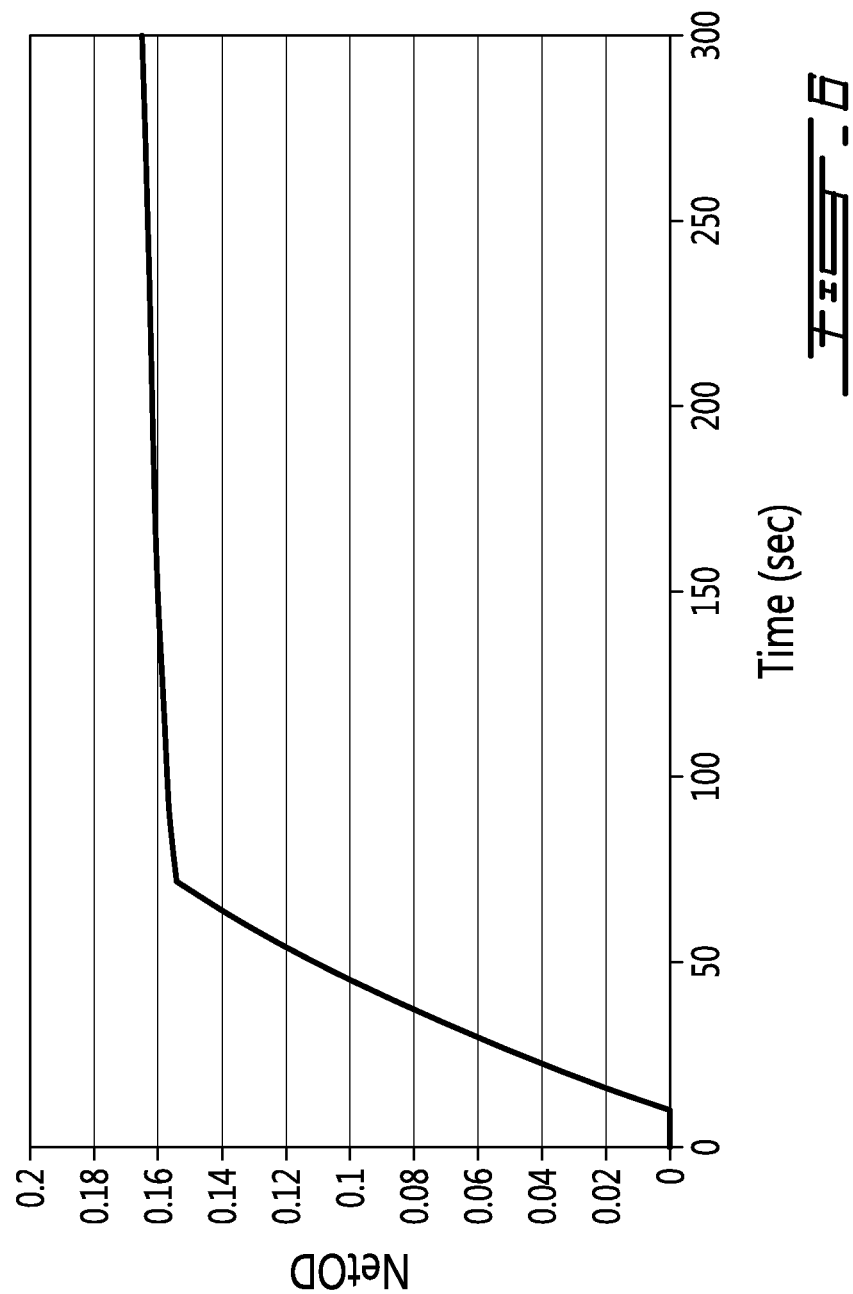
FIG. 6 is a graphical representation of the real-time change in optical density of an example fiber optic dosimeter probe before, during, and after irradiation at 500 cGy/minute to 5 Gy.

A real-time fiber optic dosimeter probe was fabricated by depositing a 1.7 μm thick radiochromic thin film on a dielectric mirror that was afterwards assembled on a fiber tip. A protective coating covered the assembled probe. The outside diameter of the plastic optical fiber was 500 μm. The fiber optic dosimeter probe was irradiated at a dose rate of 500 cGy/minute to a total dose of 5 Gy. Absorbance spectra of the fiber optic radiochromic dosimeter probe were measured before and after irradiation as shown in FIG. 5. After irradiation, the absorbance increased in the 585 nm and 636 nm bands. The real-time measurement of the optical density (OD) change, before, during, and after irradiation at 500 cGy/minute to 500 cGy is shown in FIG. 6, demonstrating that the optical dosimeter probe using radiochromic thin film at the tip is real-time sensitive.

Absorbance spectra acquired before and after irradiation of the fiber optic dosimeter probe demonstrate principle functionality of the radiochromic response. After irradiation, the absorbance increases in the 585 nm and 636 nm bands. A dynamic measurement of the optical density as a function of time, during and after irradiation to 500 cGy indicates the real time sensitivity of the radiochromic response through a fiber optic configuration.

Example 4

Other fiber optic dosimeter probes were fabricated but with thicker radiochromic thin films than that of example 3. The radiochromic thin film thicknesses were about 8, 16, and 20 μm. The goal was to increase the sensitivity of the probes to ionizing irradiation, as shown in Table 1 below.

TABLE 1

Fiber optic dosimeter probes with four different radiochromic thin film thicknesses and corresponding measured net optical density.

| Probe number | Radiochromic thin film thickness (μm) | Net optical density |
| --- | --- | --- |
| 1 (example 3) | 1.7 | 0.16 |
| 2 (example 4) | 15.8 | 1.40 |
| 3 (example 4) | 19.6 | 1.85 |
| 4 (example 4) | 7.5 | 0.80 |

Figure 7:
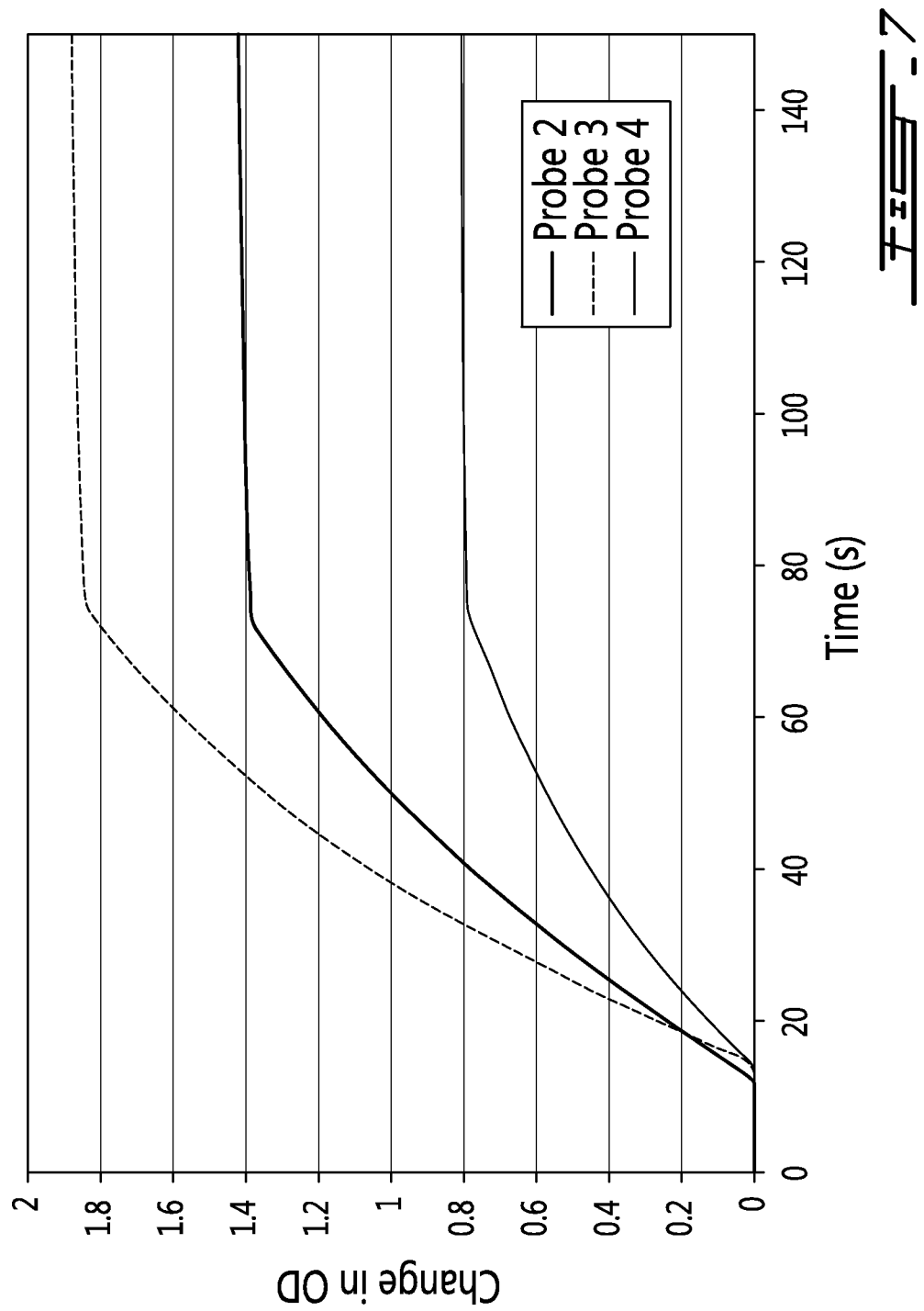
FIG. 7 is a graphical representation of the change in optical density (OD) vs. time of example fiber optic dosimeter probes at 500 cGy/minute up to 5 Gy.

Fiber optic dosimeter probes No. 2, 3, and 4 were irradiated under the same dose rate and total dose as probe No. 1 from Example 3. The real-time change in OD of these three probes before, during, and after ionizing irradiation is shown in FIG. 7. As expected, the thicker the radiochromic thin film, the higher the net OD for the same dose rate and total dose.

Figure 8:
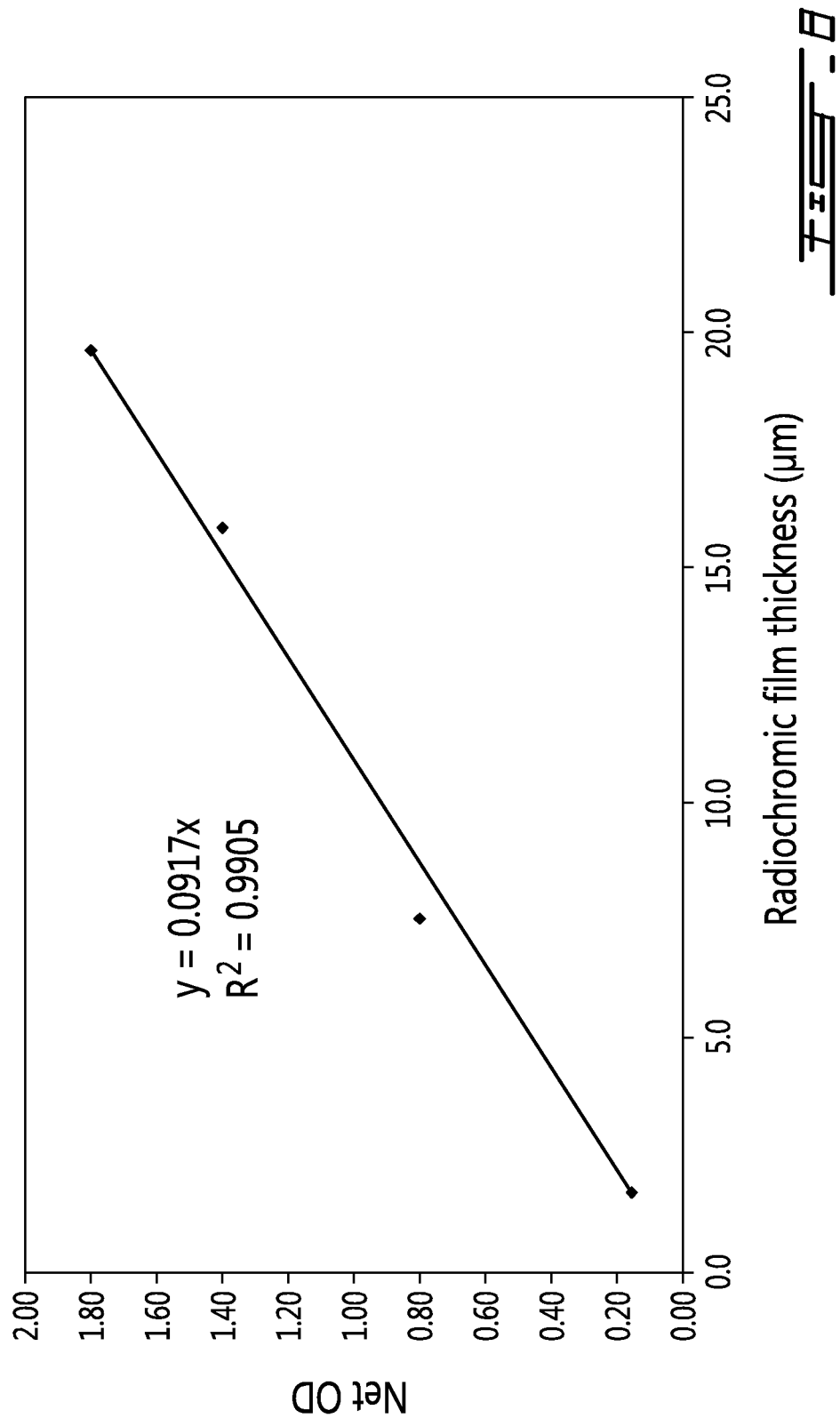
FIG. 8 is a graphical representation of the net optical density (OD) of example fiber optic dosimeter probes with respect to radiochromic thin film thickness.

Under the same ionizing irradiation conditions, by plotting the net OD vs. radiochromic thin film thickness, the net OD was shown to be linearly proportional to the radiochromic thin film thickness, see FIG. 8.

FIG. 8 illustrates the concept of varying the thickness according to a predetermined desired sensitivity. The more sensitive probes have high dose resolution, but small dynamic range; on the other hand, the less sensitive probes have higher dynamic range, but less dose resolution because they are less sensitive.

Example 5

Probes were tested for MR compatibility on 1.5 T and 3.0 T MRIs, using clinically relevant acquisition sequences (Table 2). Probes were stabilized within a 2% weight per volume agarose gel—two probes in direct contact with the gel, and the other two within plastic brachytherapy catheters 2.0 mm in diameter (Pro-Guide, Nucletron). Higher resolution scans of in situ and in-needle probes were obtained on a 7T Bruker Bio-spec using 2D-RARE and 2D-FLASH, in coronal orientation.

TABLE 2

MR-Imaging acquisition parameters used during investigations

| Sequence | Voxel Resolution (AP/RL/SI mm) | Scan Details |
| --- | --- | --- |
| GE Signa Infinity 1.5 T TwinSpeed (3D) | | |
| FSPGR | 0.83 | TE = 5.14 ms, TR = 12.056 ms, BW = 31.3 kHz |
| FR-FSE | 0.83 | TE = 112 ms, TR = 3000 ms, BW = 62.5 kHz |
| FIESTA | 0.8 × 0.8 × 0.4 | TE = 2.172 ms, TR = 4.468 ms, BW = 125 kHz |
| Siemens Magnetom Verio 3 T (3D) | | |
| VIBE | 0.53 | TE = 2.72 ms, TR = 7.09 ms, BW = 56.1 kHz |
| SPACE | 0.63 | TE = 138 ms, TR = 1000 ms, BW = 92.7 kHz |
| MPRAGE | 0.6 × 0.6 × 0.7 | TE = 3.19 ms, TR = 1400 ms, BW = 43.5 kHz |
| Bruker Bio-Spec 7 T (coronal) | | |
| 2D-RARE | 0.5 × 0.15 × 0.15 | TE = 16 ms, TR = 4000 ms, BW = 81.5 kHz |
| 2D-FLASH | 0.5 × 0.15 × 0.15 | TE = 6 ms, TR = 250 ms, BW = 81.5 kHz |

Both the in situ probes and the probes in needles corresponded to a drop in MR signal consistent with signal void. Given the choice of MR-compatible materials for the construction of the probes, no other signal artifacts were observed.

The embodiments described above are intended to be exemplary only. The scope of the invention is therefore intended to be limited solely by the appended claims.

We claim:

1. A fiber optic dosimeter probe for sensing radiation dose comprising:
   an optical fiber having a free end and a sensitive end;
   a dielectric mirror having a reflecting side and a rear side;
   a radiation sensitive layer affixed to a tip of said optical fiber and sandwiched between said sensitive end of said optical fiber and said reflecting side of said dielectric mirror, said radiation sensitive layer being made of a material having an optical property that changes with absorbed radiation dose, an amount of said material corresponding to a predetermined sensitivity to radiation;
   wherein said window dielectric mirror and said optical fiber have a near water equivalent interaction with radiation and are MR compatible.

2. The probe as claimed in claim 1, wherein said dielectric mirror is a multilayer dielectric mirror.

3. The probe as claimed in claim 1, wherein said material of said radiation sensitive layer is a radiochromic material.

4. The probe as claimed in claim 1, further comprising a biocompatible sheath having a near water equivalent interaction with radiation, said sheath covering said radiation sensitive layer, said dielectric mirror and at least partly said optical fiber.

5. The probe as claimed in claim 1, further comprising an adhesive to assemble the dielectric mirror to the optical fiber provided with the radiation sensitive material, the adhesive having a near water equivalent interaction with radiation.

6. The probe as claimed in claim 1, wherein said radiation is an ionizing radiation across one energy chosen from a range of x-ray, γ-ray, and electron energies.

7. The probe as claimed in claim 1, wherein the optical fiber is a plastic optical fiber having a numerical aperture chosen to be between 0.10 and 0.65.

8. The probe as claimed in claim 1, further comprising a fiducial, the fiducial including a metallic band with a Z number higher than a Z number of water and a Z number of said probe, said fiducial being positioned away from said radiation sensitive layer.

9. The probe as claimed in claim 8, wherein said fiducial is made of an MR-contrast material.

10. The probe as claimed in claim 9, wherein said radiation sensitive layer and said dielectric mirror are separated by a length of optical fiber and wherein said dielectric mirror is made of a MR-contrast material to provide said fiducial.

11. The probe as claimed in claim 1, wherein said probe is connected to a dosimetry system, the dosimetry system including a light source emitting light at at least one wavelength, a light detector, a coupler connected to the light source and the light detector, at least one light guide connected to the coupler at one end, one of said at least one light guide being connected to, at another end, the free end of the optical fiber.

12. The probe as claimed in claim 1, further comprising:
   a second optical fiber having a free end and a sensitive end, said sensitive end being affixed to said rear side of said dielectric mirror;
   a biocompatible capillary having a near water equivalent interaction with radiation, said capillary covering said radiation sensitive layer, said dielectric mirror and at least partly said optical fiber and said second optical fiber, said capillary being affixed to said probe using an adhesive material.

13. The probe as claimed in claim 12, wherein said optical fiber and said second optical fiber are separated sections of a single optical fiber.

14. A method for fabrication of a fiber optic dosimeter probe, comprising:
   providing a radiochromic radiation sensitive material;
   providing an optical fiber having a core;
   providing a dielectric mirror of a size at least equal to a size of said core of said optical fiber;

depositing and attaching said radiochromic radiation sensitive material on a tip of said optical fiber, between said optical fiber and said dielectric mirror to form an assembled probe, said radiochromic radiation sensitive material having a thickness corresponding to a predetermined sensitivity to radiation;

wherein said dielectric mirror and said optical fiber have a near water equivalent interaction with radiation and are MR compatible.

15. The method as claimed in claim 14, wherein said attaching comprises at least one of assembling, adhering, and consolidating.

16. The method as claimed in claim 14, wherein said depositing and attaching comprises depositing said radiation sensitive material onto one of said optical fiber and said dielectric mirror.

17. The method as claimed in claim 16, wherein said depositing comprising one of spin coating, doctor blading, dip coating.

18. The method as claimed in claim 14, wherein said thickness is smaller than 20 µm.

19. The method as claimed in claim 14, wherein said optical fiber has at least one of an exposed tip, a polished tip, an ultrasound cleaned tip.

20. The method as claimed in claim 14, further comprising:
providing a second optical fiber;
providing a biocompatible capillary having a near water equivalent interaction with radiation, said biocompatible capillary having an insertion hole;
wherein said depositing and attaching said radiochromic radiation sensitive material between said optical fiber and said dielectric mirror includes inserting said optical fiber within said capillary from one end, inserting said second optical fiber within said capillary form another end, aligning said insertion hole between said optical fiber and said second optical fiber, inserting said radiation sensitive material and said dielectric mirror between said optical fiber and said second optical fiber through said insertion hole, using an adhesive material to affix said radiation sensitive material to said dielectric mirror, said optical fiber and said second optical fiber.

21. A method for fabrication of a capillary fiber optic dosimeter probe, comprising:
providing a radiochromic radiation sensitive material, said radiochromic radiation sensitive material having a thickness corresponding to a predetermined sensitivity to radiation;
providing an optical fiber having a core;
providing a second optical fiber;
providing a biocompatible capillary having a near water equivalent interaction with radiation, said biocompatible capillary having an insertion hole;
inserting said optical fiber within said capillary from one end;
inserting said second optical fiber within said capillary form another end;
aligning said insertion hole between said optical fiber and said second optical fiber;
inserting said radiation sensitive material between said optical fiber and said second optical fiber through said insertion hole, using an adhesive material to affix said radiation sensitive material to said optical fiber and said second optical fiber;
wherein said optical fiber and said second optical fiber have a near water equivalent interaction with radiation and are MR compatible.

22. The method as claimed in claim 21, further comprising adhering said radiochromic radiation sensitive material to a substrate prior to said inserting.

23. A fiber optic dosimeter probe for sensing radiation dose comprising:
an optical fiber having a free end and a sensitive end;
a window having a sensitive side and a rear side;
a radiation sensitive layer between said sensitive end of said optical fiber and a sensitive side of said window, said radiation sensitive layer being made of a material having an optical property that changes with absorbed radiation dose, an amount of said material corresponding to a predetermined sensitivity to radiation;
an adhesive to assemble the window to the optical fiber provided with the radiation sensitive material;
wherein said window and said optical fiber have a near water equivalent interaction with radiation and are MR compatible and said adhesive has a near water equivalent interaction with radiation.

24. The fiber optic dosimeter as claimed in claim 23, wherein said window is a dielectric mirror.

25. A fiber optic dosimeter probe for sensing radiation dose comprising:
an optical fiber having a free end and a sensitive end;
a window having a sensitive side and a rear side;
a radiation sensitive layer between said sensitive end of said optical fiber and a sensitive side of said window, said radiation sensitive layer being made of a material having an optical property that changes with absorbed radiation dose, an amount of said material corresponding to a predetermined sensitivity to radiation;
a fiducial including a metallic band with a Z number higher than a Z number of water and a Z number of said probe, said fiducial being positioned away from said radiation sensitive layer;
wherein said window and said optical fiber have a near water equivalent interaction with radiation and are MR compatible.

26. The probe as claimed in claim 25, wherein said fiducial is made of an MR-contrast material.

27. The fiber optic dosimeter as claimed in claim 25, wherein said window is a dielectric mirror.

* * * * *

UNITED STATES PATENT AND TRADEMARK OFFICE
CERTIFICATE OF CORRECTION

| | | |
|---|---|---|
| PATENT NO. | : 9,000,401 B2 | Page 1 of 1 |
| APPLICATION NO. | : 13/806342 | |
| DATED | : April 7, 2015 | |
| INVENTOR(S) | : Rink et al. | |

It is certified that error appears in the above-identified patent and that said Letters Patent is hereby corrected as shown below:

In the specification

Column 11, line 16, the expression "5 cGy with only 32 m thickness" should read "5 cGy with only 32 μm thickness".

Column 13, line 8, the expression "*a* and *b* in Fig. 3c" should read "*a* and *b* in Fig. 3C".

In the claims

In Claim 1, column 16, line 9, the word "window" should be deleted.

In Claim 20, column 17, line 34, the word "form" should read "from".

In Claim 21, column 18, line 2, the word "form" should read "from".

Signed and Sealed this
Second Day of February, 2016

Michelle K. Lee
*Director of the United States Patent and Trademark Office*